United States Patent [19]

Komata et al.

[11] Patent Number: 5,710,470
[45] Date of Patent: *Jan. 20, 1998

[54] HYDRODYNAMIC BEARING ASSEMBLY

[75] Inventors: Kimio Komata, Saitama-ken;
Toshihiro Otani, Kanagawa-ken;
Yasushi Hisabe, Kanagawa-ken;
Katsutoshi Chiba, Kanagawa-ken;
Akihiro Machida, Kanagawa-ken, all of Japan

[73] Assignee: Ebara Corporation, Tokyo, Japan

[*] Notice: The terminal 36 months of this patent has been disclaimed.

[21] Appl. No.: 476,907

[22] Filed: Jun. 7, 1995

Related U.S. Application Data

[63] Continuation of Ser. No. 858,941, Mar. 27, 1992, abandoned.

[30] Foreign Application Priority Data

Apr. 4, 1991 [JP] Japan .................... 3-099537

[51] Int. Cl.⁶ .......................................... H02K 7/09
[52] U.S. Cl. .............................................. 310/90.5
[58] Field of Search .................... 310/90, 90.5, 231, 310/254, 261; 384/99

[56] References Cited

U.S. PATENT DOCUMENTS

| | | | |
|---|---|---|---|
| 4,167,295 | 9/1979 | Glaser | 308/9 |
| 4,552,417 | 11/1985 | Yamashita et al. | 308/10 |
| 4,570,093 | 2/1986 | Morii et al. | 310/46 |
| 4,701,651 | 10/1987 | Tanaka | 310/90 |
| 4,726,640 | 2/1988 | Iwama et al. | 310/90.5 |
| 4,984,881 | 1/1991 | Osada et al. | 350/6.8 |
| 5,019,738 | 5/1991 | Weilbach et al. | 310/90.5 |
| 5,036,235 | 7/1991 | Kleckner | 310/90.5 |
| 5,069,515 | 12/1991 | Itami et al. | 310/90 |

FOREIGN PATENT DOCUMENTS

| | | | |
|---|---|---|---|
| 51-132353 | 11/1976 | Japan | 310/90.5 |
| 58-142025 | 8/1983 | Japan | 310/90.5 |
| 58-224324 | 12/1983 | Japan | 310/90.5 |
| 59-204443 | 11/1984 | Japan | 310/90.5 |
| 60-244913 | 12/1985 | Japan | 310/90.5 |
| 61-15547 | 1/1986 | Japan | 310/90.5 |
| 61-53617 | 3/1986 | Japan | 310/90.5 |
| 62-20914 | 1/1987 | Japan | 310/90.5 |
| 62-85216 | 4/1987 | Japan | 310/90.5 |
| 62-92750 | 4/1987 | Japan | 310/90.5 |
| 62-151518 | 9/1987 | Japan | 310/90.5 |
| 62-154413 | 9/1987 | Japan | 310/90.5 |
| 62-156911 | 10/1987 | Japan | 310/90.5 |
| 63-51929 | 4/1988 | Japan | 310/90.5 |
| 63-70532 | 5/1988 | Japan | 310/90.5 |
| 63-259510 | 10/1988 | Japan | 310/90.5 |
| 63-194556 | 12/1988 | Japan | 310/90.5 |
| 64-15823 | 1/1989 | Japan | 310/90.5 |
| 1209954 | 2/1986 | U.S.S.R. | 310/90.5 |

*Primary Examiner*—Matthew V. Nguyen
*Attorney, Agent, or Firm*—Wenderoth, Lind & Ponack

[57] ABSTRACT

A hydrodynamic bearing assembly includes a support shaft provided on a stationary member, a rotating member rotatably supported on the support shaft through a hydrodynamic radial bearing and a hydrodynamic thrust bearing, a magnet provided at a stationary side, and a magnetic member provided on the rotating member opposite the magnet. The magnetic member is attracted by the magnetic force from the magnet so that a force acting on the thrust hydrodynamic bearing is cancelled or reduced.

30 Claims, 4 Drawing Sheets

HYDRODYNAMIC BEARING ASSEMBLY

This application is a Continuation of now abandoned application, Ser. No. 07/858,941, filed Mar. 27, 1992, abandoned.

BACKGROUND OF THE INVENTION

1. Field of the Invention

The present invention relates to a hydrodynamic bearing apparatus used to support a rotating member on a stationary support shaft through a radial hydrodynamic bearing and a thrust hydrodynamic bearing. More particularly, the present invention relates to a hydrodynamic bearing apparatus which minimizes the torque required at the start of rotation of the rotating member.

2. Prior Art

A hydrodynamic bearing apparatus for supporting a rotating member on a stationary support shaft through a radial hydrodynamic bearing and a thrust hydrodynamic bearing is known.

For example, FIG. 4 is a sectional view showing the structure of a rotating mirror optical deflector that employs a conventional hydrodynamic bearing apparatus. The rotating mirror optical deflector has a structure in which a mirror having a polyhedral outer periphery, i.e., a polygon mirror 11, rotates around a support shaft 10 through hydrodynamic bearings, as illustrated.

The above-described hydrodynamic bearing apparatus comprises a radial bearing 12 having a sleeve-like radial bearing member 12a mounted on stationary support shaft 10, an upper thrust bearing 13 having an upper thrust place 13a, and a lower thrust bearing 14 having a lower thrust plate 14a. The lower thrust plate 14a, the radial bearing member 12a and the upper thrust plate 13a are secured to the support shaft 10 by fastening a nut 23 to the shaft 10 with a washer 22 interposed therebetween. It should be noted that reference numeral 15 denotes a sleeve-like hydrodynamic bearing movable member that constitutes a movable part of the radial bearing 12 and the upper and lower thrust bearings 13 and 14.

The support shaft 10 is secured to a motor base 16, and a motor coil 17 is disposed on the top surface of the motor base 16 and on the outer periphery of the lower end of the support shaft 10. A motor rotor 18 is secured to the outer periphery of the hydrodynamic bearing movable member 15, for example, by shrink-fitting, and a motor magnet 19 is secured to the lower surface of the motor rotor 18 so that the motor magnet 19 faces the motor coil 17. The polygon mirror 11 is disposed on the top of the motor rotor 18, and a support member 20 made of an aluminum material is disposed on the polygon mirror 11. The polygon mirror 11 is clamped between the motor rotor 18 and the support member 20 by screws 21.

It should be noted that reference numeral 24 denotes a motor cover that is secured to the motor base 16, and a cap 25 that is attached to the top of the motor cover 24.

In the rotating mirror optical deflector employing the above-described hydrodynamic bearing apparatus, when the motor coil 17 is supplied with an alternating current, a revolving magnetic field is generated, so that attraction or repulsion occurs between the revolving magnetic field and the motor magnet 19, causing the motor rotor 18, the hydrodynamic bearing movable member 15, the support member 20 and the polygon mirror 11 to rotate around the support shaft 10 as a unit.

In the meantime, the outer peripheral surface of the radial bearing member 12a that constitutes the radial bearing 12 is formed with dynamic pressure generating grooves, e.g., herringbone grooves, so that dynamic pressure is generated in between the outer peripheral surface of the radial bearing member 12a and the inner peripheral surface of the hydrodynamic bearing movable member 15. In addition, that surface of the upper thrust plate 13a which faces the hydrodynamic bearing movable member 15 and that surface of the lower thrust plate 14a which faces hydrodynamic bearing movable member 15 are formed with respective dynamic pressure generating grooves, e.g., spiral grooves, so that dynamic pressure is generated in between each of these surfaces and the corresponding surface of the bearing movable member 15. Thus, the bearing movable member 15 rotates around the radial bearing 12 in a non-contact manner.

In the hydrodynamic bearing apparatus having the above-described arrangement, when the motor rotor 18 reaches a predetermined rotational speed after the start of the rotation, dynamic pressure is generated at each of the sliding surfaces of the radial bearing 12 and the upper and lower thrust bearings 13 and 14, so that the bearing movable member 15 rotates in a non-contact manner. However, when the motor rotor 18 starts its rotation, no dynamic pressure is available, so that a large torque is needed to overcome a large amount of friction due to the weight of the rotating member, the attraction force acting on the motor magnet and the like, and the motor rotor 18 may fail to start rotating under certain circumstances.

SUMMARY OF THE INVENTION

In view of the above-described circumstances, it is an object of the present invention to provide a hydrodynamic bearing apparatus which minimizes the torque required at the time of starting the rotation of the rotating member.

To attain the above-described object, the present invention provides a hydrodynamic bearing apparatus for supporting a rotating member on a support shaft provided on a stationary member through a radial hydrodynamic bearing and a thrust hydrodynamic bearing, comprising: a magnetic member provided on said rotating member; and a magnet provided on said stationary member opposite said magnetic member provided on said rotating member; whereby said magnetic member is attracted by the magnetic force from said magnet so that a force acting on said thrust hydrodynamic bearing is cancelled or reduced.

The force acting on the thrust hydrodynamic bearing may be the weight of the rotating member. However, when said rotating member includes a motor rotor having a motor magnet, and a motor coil cooperating with said motor magnet is provided on said stationary member, said force may be the weight of said rotating member and/or the attracting force acting on said motor magnet.

The rotating member may include a polygon mirror whereby the assembly is a rotating mirror optical deflector. The polygon mirror may be supported on said rotating member by a support member formed by a magnetic material and constituting said magnetic member. Alternately, a part of said support member may be formed by a magnetic material or a magnet may be provided on said supporting member.

A cover member may be provided on said stationary member, and a cap is provided on the top of the cover member. The magnet may be provided on the inner surface of said cap, and the effect of the magnetic force of said magnet on the magnetic member is adjustable by shifting said magnet to and away from said magnetic member by moving said cap relative to said cover member.

According to another aspect of the invention, said magnet is provided on a magnet securing member secured to said support shaft at a position which faces said support member. The magnet securing member may be provided on said support shaft so that the height thereof is adjustable and thereby adjust the attraction force of said magnet.

According to a further aspect of the invention, the rotating member can be rotated by rotating said cap relative to said cover member. In this case a spacer may be removably interposed between said cap and said motor cover and said magnet can be adhered to said magnetic member by removing said spacer from between said cap and said motor cover.

According to the present invention, since a magnet is provided on the stationary member to attract a magnetic member provided on the rotating member, even if the weight of the rotating member and other forces are applied to the thrust hydrodynamic bearing, the attraction force from the magnet acts in a direction in which the applied force is cancelled or reduced. Accordingly, the friction that occurs at the rotating member of the hydrodynamic bearing apparatus is reduced and the torque required at the time of starting is minimized.

When the rotating member is rotated by moving the cap relative to the cover member so as to allow the magnet to adhere to the magnetic member and then the cap is rotated relative to the cover member, the rotating member can be rotated externally, and it is therefore possible to prevent dust or the like from entering inside of the cover and hence it is possible to keep the interior clean. Accordingly, when the invention is in the form of a rotating mirror optical deflector having a polygon mirror provided on a rotating member, an optical adjustment can be made with the clean state maintained.

The above and other objects, features and advantages of the present invention will become more apparent from the following description when taken in conjunction with the accompanying drawings in which a preferred embodiment of the present invention is shown by way of illustrative examples.

DETAILED DESCRIPTION OF THE PREFERRED EMBODIMENTS

Figure 1:
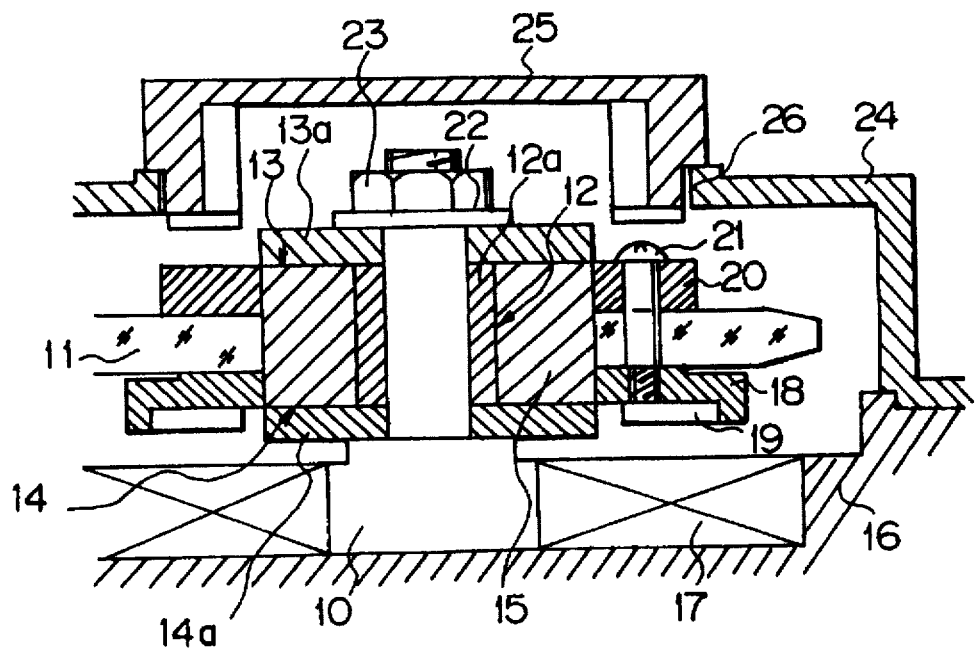
FIG. 1 is a sectional view of a rotating mirror optical deflector employing one embodiment of the hydrodynamic bearing apparatus according to the present invention.
Figure 4:
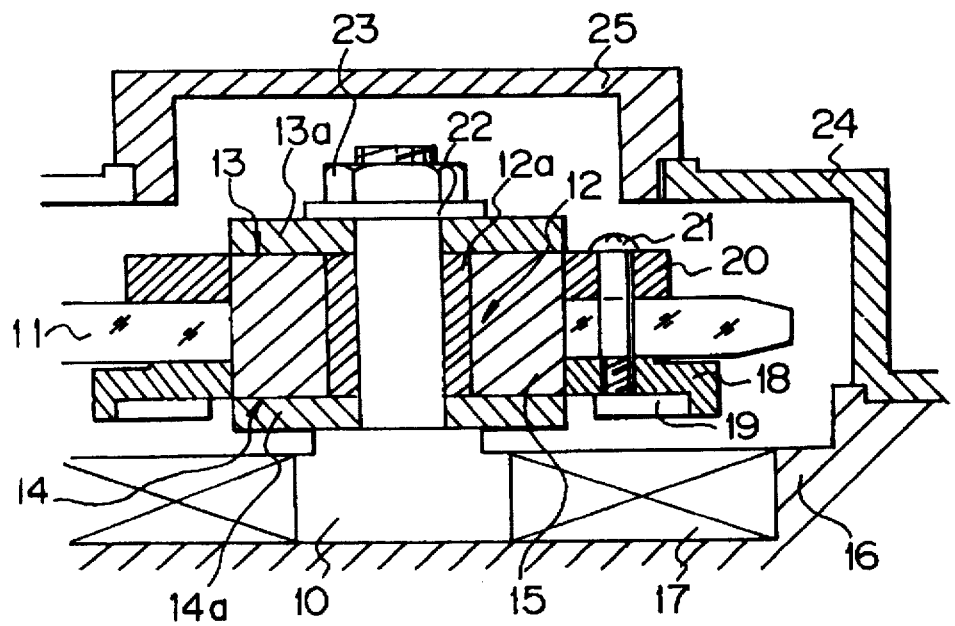
FIG. 4 is a sectional view of a rotating mirror optical deflector employing a conventional hydrodynamic bearing apparatus.

Preferred embodiments of the present invention will be described below with reference to the accompanying drawings. FIG. 1 is a sectional view of a rotating mirror optical deflector that employs one embodiment of the hydrodynamic bearing apparatus according to the present invention. In this figure, the same reference numerals are used to designate portions or members which as those in FIG. 4 are the same; therefore, a description thereof is omitted (the same in the case with the other drawings). As illustrated, a single-pole magnet or magnets 26 is or are provided at the lower end of the inner surface of the cap 25 at a proper distance from the support member 20, and a suitable magnetic material, e.g., SUS, is employed for the support member 20. When a plurality of magnets 26 are provided, they are circumferentially spaced from each other.

Thus, the magnetic flux from the magnet 26 causes an attractive force to act on the support member 20 so as to cancel or reduce the force applied to the thrust bearing 14 owing to the weight of a rotating member which comprises the bearing movable member 15, the motor rotor 18 having a motor magnet 19, the polygon mirror 11 and the support member 20 and the attraction force acting on the motor magnet 19. In other words, the attraction force of the magnetic flux from the magnet 26 is adjusted so as to balance with the weight of the rotating member and the attraction force acting on the motor magnet 19. The attraction force of the magnet 26 can be adjusted by moving the cap 25 vertically.

When the rotating mirror optical deflector is used in a horizontal position, that is, when the motor is placed in a horizontal position, since the weight of the rotating member is not exerted on the thrust bearing 14, the attraction force of the magnet 26 is adjusted so as to balance With the attraction force acting on the motor magnet 19. When the motor is placed obliquely or upside down, the attraction force of the magnet 26 is adjusted so as to balance with the rotating member according to its position.

As stated above, since the magnet 26 is provided and a magnetic material is employed for the support member 20 as described above, the attraction force from the magnet 26 cancels or reduces the weight of the rotating member and the attraction force acting on the motor magnet 19, so that it is possible to minimize the torque required at the time of starting the motor.

Figure 2:
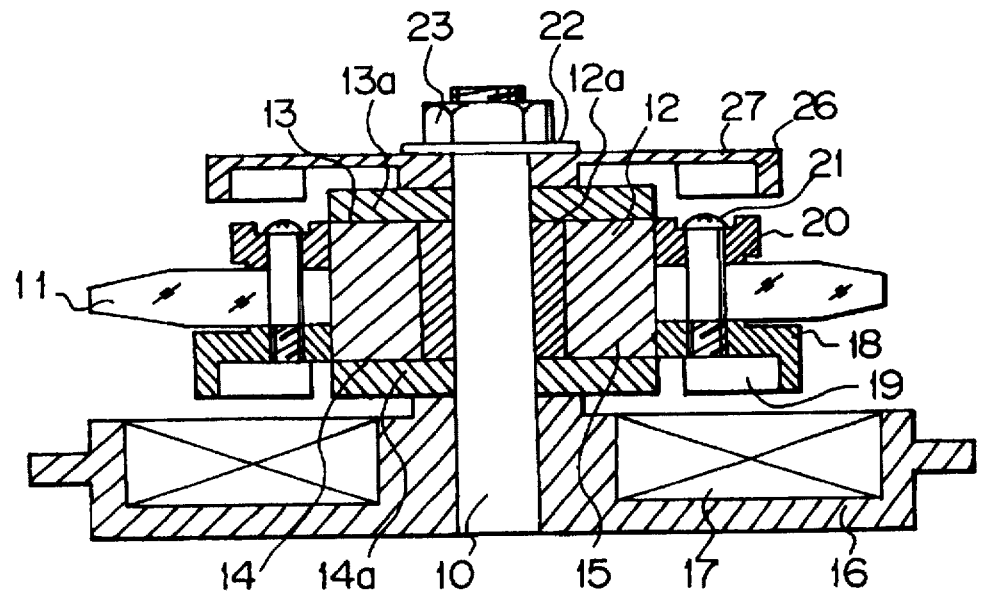
FIG. 2 is a sectional view of a rotating mirror optical deflector employing another embodiment of the hydrodynamic bearing apparatus according to the present invention.

FIG. 2 is a sectional view of a rotating mirror optical deflector that employs another embodiment of the hydrodynamic bearing apparatus according to the present invention. As shown in FIG. 2, a disc-shaped magnet securing member 27 is provided between the upper thrust plate 13a on the upper portion of the support shaft 10 and the washer 22, and the magnet 26 is secured to the lower surface of the magnet securing member 27 and at a position which faces the support member 20 at a proper distance.

Since the magnet 26 is secured to the magnet securing member 27 secured to the support shaft 10 at a proper distance from the support member 20, the attraction force from the magnet 26 cancels or reduces the weight of the rotating member and the attraction force acting on the motor magnet 19, so that it is possible to minimize the torque required at the time of starting the motor. It is also possible to adjust the attraction force of the magnet 26 by adjusting the height of the magnet securing member 27, by, for example, interposing a spacer of a selected thickness between the magnet securing member 27 and the upper thrust plate 13a.

Figure 3:
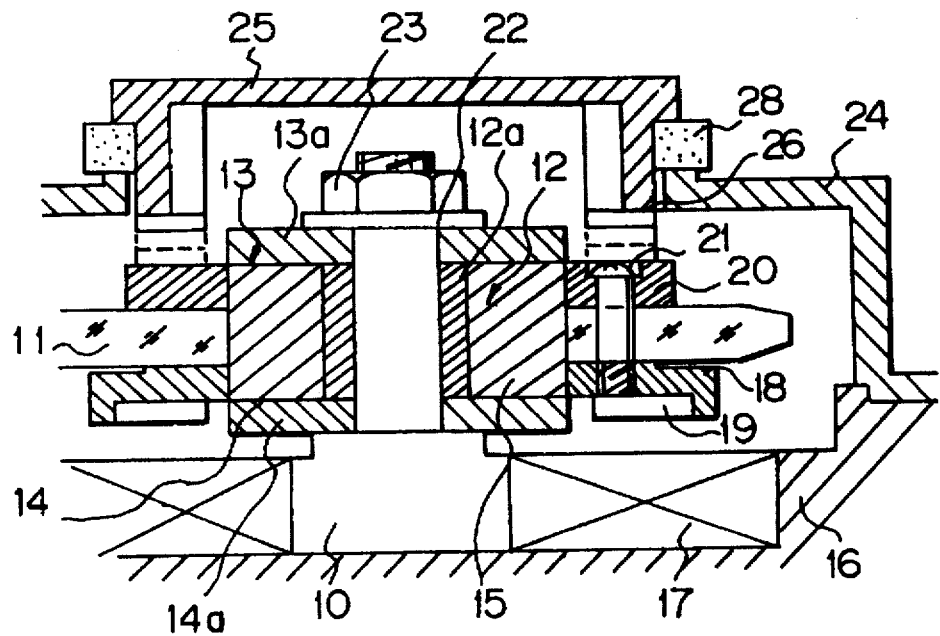
FIG. 3 is a sectional view of a rotating mirror optical deflector employing still another embodiment of the hydrodynamic bearing apparatus according to the present invention.

FIG. 3 is a sectional view of a rotating mirror optical deflector that employs still another embodiment of the hydrodynamic bearing apparatus according to the present invention. The arrangement shown in FIG. 3 is the same as that shown in FIG. 1 in that the single-pole magnet 26 is provided at the lower end of the inner surface of the cap 25 at a proper distance from the support member 20 and a magnetic material, e.g., SUS, is employed for the support member 20. However, in this embodiment, a spacer 28 is removably interposed between the cap 25 and the motor cover 24.

Since the spacer 28 is removably interposed between the cap 25 and the motor cover 24 as described above, if the spacer 28 is removed, the cap 25 is lowered and the support member 20 is attracted to adhere to the magnet 26. Thus, by rotating the cap 25 in this state, the polygon mirror 11 is rotated, and an optical adjustment can be made. It should be noted that, if the attraction force of the magnet 26 is strong, the polygon mirror 11 can be rotated for optical adjustment simply by rotating the cap 25 without vertically shifting the magnet 26 to attract the support member 20. Thus, it is unnecessary to open the cap 25 during the optical adjustment, and it is possible to prevent dust or the like from entering inside the motor cover. Accordingly, the optical adjustment can be conducted while a high degree of cleanliness is maintained. It is also possible to adjust the attraction force of the magnet 26 by providing a spacer 28 of a certain height.

Figure 5:
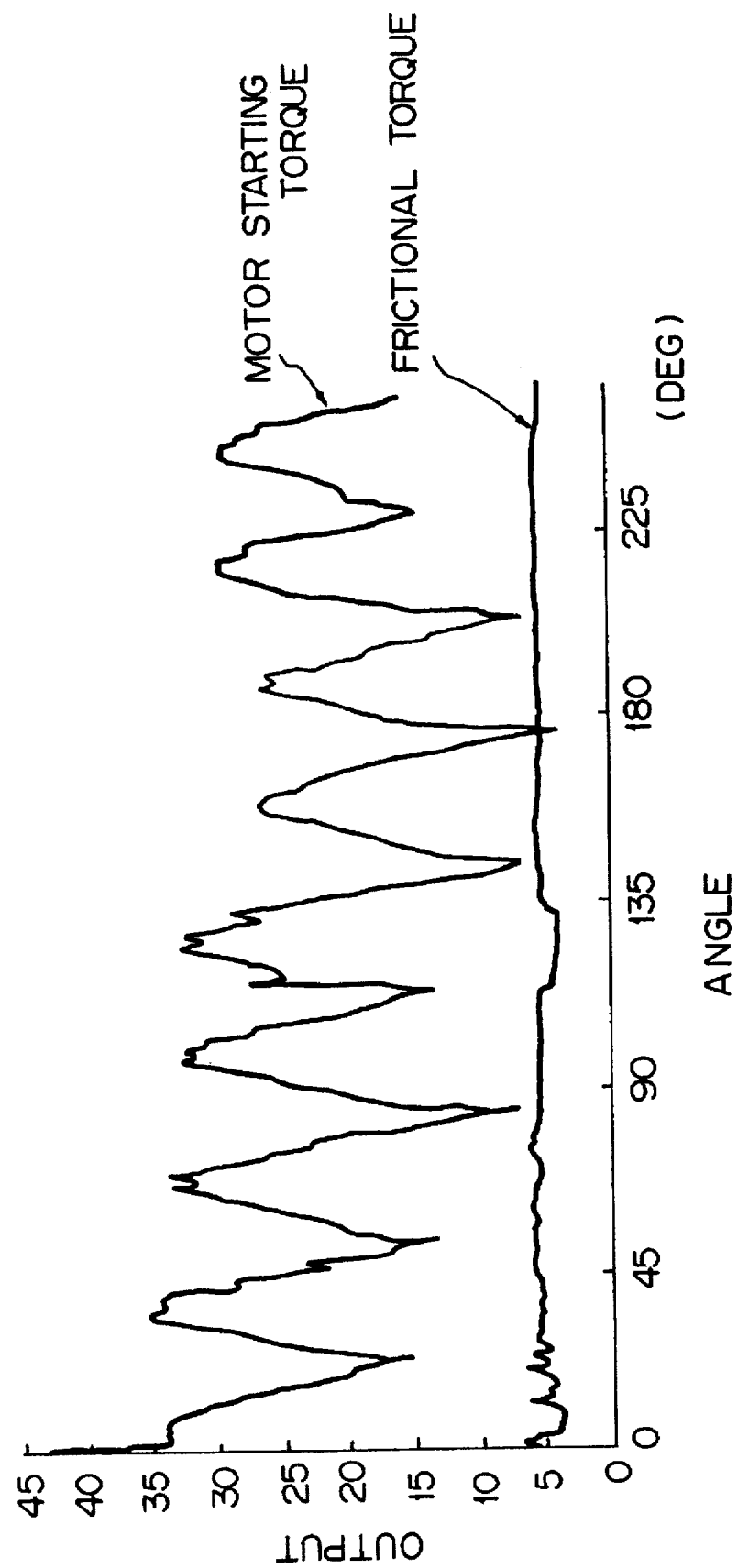
FIG. 5 is a graph showing experimental results of a hydrodynamic bearing apparatus according to the prior art.
Figure 6:
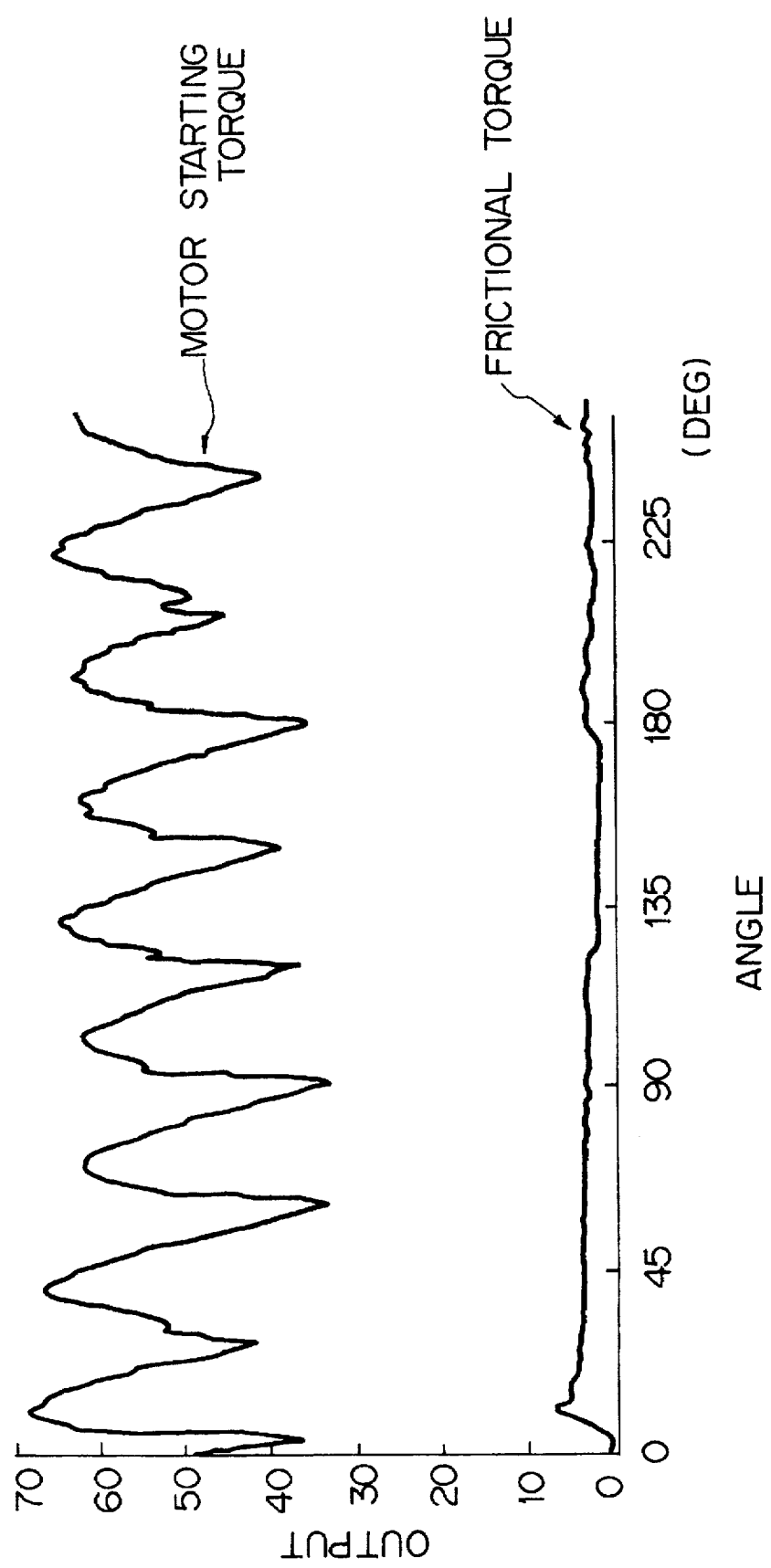
FIG. 6 is a graph showing experimental results of a hydrodynamic bearing apparatus according to the present invention.

FIG. 5 is a graph showing experimental results of a hydrodynamic bearing apparatus according to the prior art shown in FIG. 4, and FIG. 6 is a graph showing experimental results of the hydrodynamic bearing apparatus according to the present invention, shown in FIG. 1. As will be clear from FIG. 5, in the prior art the frictional torque is large due to the attracting force acting on the motor magnet and the weight of the rotating member, so that no adequate starting torque can be obtained. In contrast, in the present invention, since the rotating member is attracted by the magnet 26, the frictional torque is less, and a sufficiently high motor starting torque can be obtained, as shown in FIG. 6. Furthermore, it will be apparent that this is achieved without preloading of the rotating member toward upper thrust bearing 13 and generation of friction therebetween, particularly during post-startup high speed rotation.

Although in the foregoing embodiments the hydrodynamic bearing apparatus of the present invention is used in a rotating mirror optical deflector having the polygon mirror 11, it should be noted that the hydrodynamic bearing apparatus of the present invention is not necessarily limited thereto and that the present invention is widely applicable to hydrodynamic bearing apparatuses designed to support a rotating member on a support shaft provided on a stationary member.

Also, in the foregoing embodiments, although the support member 20 constituting the rotating member is formed from a magnetic material, e.g., SUS, it should be noted that the present invention is not necessarily limited thereto and that a part of the support member 20 may be formed using a magnetic material. It is also possible to provide a magnetic member, e.g., a magnet, on the top of the support member 20. The magnet 26 may be either a permanent magnet or an electromagnet. In particular, when an electromagnet is employed, it is possible to change the magnetic force for balancing the rotating member in accordance with the position in which the motor is used.

As has been described above, the present invention provides the following advantageous effects:

(1) Since a magnet is provided on the stationary member to generate an attraction force with respect to a magnetic member provided on the rotating member, even if the weight of the rotating member and another force are applied to a thrust hydrodynamic bearing that constitutes the hydrodynamic bearing apparatus, the attraction force from the magnet acts in a direction in which the applied force is cancelled or reduced. Accordingly, the torque required at the time of starting the rotating member is minimized.

(2) When the rotating member is rotated by allowing the magnet to adhere to the magnetic member and then rotating the cap relative to the cover member, the rotating member can be rotated externally, and it is therefore possible to prevent dust or the like from entering inside of the cover and hence, it is possible to keep the interior clean.

What is claimed is:

1. A hydrodynamic bearing assembly comprising:

a support shaft;

a stationary member on which said support shaft is disposed;

a rotating member;

a hydrodynamic radial bearing rotatably mounting said rotating member on said support shaft;

a lower hydrodynamic thrust bearing supporting said rotating member from below in the axial direction thereof such that the weight of said rotating member acts on said hydrodynamic thrust bearing;

a magnetic member provided on said rotating member; and a magnet disposed on said stationary member opposite said magnetic member so as to exert thereon a magnetic force sufficient to ensure that said magnetic member and said rotating member are attracted by said magnetic force from said magnet to such an extent that said weight of said rotating member acting on said hydrodynamic thrust bearing is offset entirely or reduced.

2. A hydrodynamic bearing assembly according to claim 1, wherein said rotating member includes a motor rotor having a motor magnet, and a motor coil cooperating with said motor magnet is provided on said stationary member, said motor coil exerting a force on said motor magnet attracting said motor magnet toward said hydrodynamic thrust bearing, and which force is offset by the magnetic force from said magnet.

3. A hydrodynamic bearing assembly according to claim 2, wherein said rotating member includes a polygon mirror whereby said assembly constitutes a rotating mirror optical deflector.

4. A hydrodynamic bearing assembly according to claim 3, wherein said rotating member includes a movable bearing member having a radial and thrust bearing surfaces, and a support member supporting said polygon mirror.

5. A hydrodynamic bearing assembly according to claim 4, wherein said support member consists of a magnetic material and constitutes said magnetic member.

6. A hydrodynamic bearing assembly according to claim 4, wherein a part of said support member is of a magnetic material and constitutes said magnetic member.

7. A hydrodynamic bearing assembly according to claim 4, wherein said magnetic member is a magnet provided on said supporting member.

8. A hydrodynamic bearing assembly according to claim 5, wherein said stationary member includes a base, a cover member provided on said base, and a cap provided on the top of said cover and extending over said rotating member, said cap being movable relative to said cover, said magnet being provided on the inner surface of said cap, and the effect of the magnetic force of said magnet on said magnetic member being adjustable by shifting said magnet to and away from said magnetic member by moving said cap relative to said cover member.

9. A hydrodynamic bearing assembly according to claim 1, wherein said magnet comprises a permanent magnet.

10. A hydrodynamic bearing assembly according to claim 4, and further comprising a magnet securing member secured to said support shaft at a position at which the securing member faces said support member, said magnet being provided on said securing member.

11. A hydrodynamic bearing assembly according to claim 10, wherein said magnet securing member is provided on said support shaft in a manner in which the height thereof is adjustable so that the effect of the attraction force of said magnet on said magnetic member is adjustable.

12. A hydrodynamic bearing assembly according to claim 8, wherein said cap is rotatable relative to said cover member such that said rotating member can be rotated by rotating said cap relative to said cover member.

13. A hydrodynamic bearing assembly according to claim 12, and further comprising a spacer removably interposed between said cap and said cover member, and wherein said magnet can be adhered to said magnetic member by removing said spacer from between said cap and said cover member.

14. A hydrodynamic bearing apparatus according to claim 6, and further comprising a cover member provided on said stationary member, and a cap provided on the top of said cover and extending over said rotating member, said cap being movable relative to said cover, said magnet being provided on the inner surface of said cap, and the effect of the magnetic force of said magnet on said magnetic member being adjustable by shifting said magnet to and away from said magnetic member by moving said cap relative to said cover member.

15. A hydrodynamic bearing apparatus according to claim 7, and further comprising a cover member provided on said stationary member, and a cap provided on the top of said cover and extending over said rotating member, said cap being movable relative to said cover, said magnet being provided on the inner surface of said cap, and the effect of the magnetic force of said magnet on said magnetic member being adjustable by shifting said magnet to and away from said magnetic member by moving said cap relative to said cover member.

16. A hydrodynamic bearing assembly according to claim 14, wherein said cap is rotatable relative to said cover member such that said rotating member can be rotated by rotating said cap relative to said cover member.

17. A hydrodynamic bearing assembly according to claim 16, and further comprising a spacer removably interposed between said cap and said cover member, and wherein said magnet can be adhered to said magnetic member by removing said spacer from between said cap and said cover member.

18. A hydrodynamic bearing assembly according to claim 15, wherein said cap is rotatable relative to said cover member such that said rotating member can be rotated by rotating said cap relative to said cover member.

19. A hydrodynamic bearing assembly according to claim 18, and further comprising a spacer removably interposed between said cap and said cover member, and wherein said magnet can be adhered to said magnetic member by removing said spacer from between said cap and said cover member.

20. A hydrodynamic bearing assembly as claimed in claim 1, further comprising an upper hydrodynamic thrust bearing guiding rotation of said rotating member from above in said axial direction thereof, and said magnetic force of said magnet is such as to prevent preloading of said rotating member toward said upper hydrodynamic thrust bearing and generation of friction therebetween.

21. A hydrodynamic bearing assembly as claimed in claim 1, wherein said magnet comprises an electromagnet.

22. An assembly comprising:

a stationary base;

a support shaft disposed on said base;

a rotating member mounted for rotation about said support shaft by a hydrodynamic radial bearing;

a hydrodynamic thrust bearing supporting said rotating member from below in the axial direction thereof such that the weight of said rotating member acts on said hydrodynamic thrust bearing;

a stationary cover member on said base;

a cap on said cover member and being movable relative thereto at a position above said rotating member;

said rotating member including a magnetic member;

a magnet on said cap at a position confronting said magnetic member and exerting thereon a magnetic force sufficient to ensure that said magnetic member and said rotating member are attracted by said magnetic force to an extent such that said weight of said rotating member acting on said hydrodynamic thrust bearing is offset entirely or reduced; and the effect of said magnetic force of said magnet being adjustable by shifting said magnet toward and away from said magnetic member by movement of said cap relative to said cover member.

23. An assembly as claimed in claim 22, wherein said cap is rotatable relative to said cover member, such that said rotating member can be rotated by rotating said cap relative to said cover member.

24. An assembly as claimed in claim 22, further comprising a spacer removably interposed between said cover member and said cap, whereby removal of said spacer will move said cap and said magnet toward said magnetic member.

25. An assembly as claimed in claim 22, further comprising an upper hydrodynamic thrust bearing guiding rotation of said rotating member from above in said axial direction thereof, and said magnetic force of said magnet is such as to prevent preloading of said rotating member toward said upper hydrodynamic thrust bearing and generation of friction therebetween.

26. An assembly as claimed in claim 22, wherein said rotating member includes a motor rotor having a motor magnet, and further comprising a motor coil on said base and exerting a force on said motor magnet urging said motor magnet and said rotating member toward said hydrodynamic thrust hearing, and said adjustable effect of said magnetic force of said magnet on said magnetic member being sufficient to offset entirely or reduce said force of said motor magnet.

27. An assembly as claimed in claim 22, wherein said rotating member further includes a polygonal mirror supported by a support member.

28. An assembly as claimed in claim 27, wherein said support member consists of a magnetic material and constitutes said magnetic member.

29. An assembly as claimed in claim 27, wherein a part of said support member is of a magnetic material and constitutes said magnetic member.

30. An assembly as claimed in claim 27, wherein said magnetic member comprises a magnet on said support member.

* * * * *